United States Patent
Lin

(10) Patent No.: US 9,361,110 B2
(45) Date of Patent: Jun. 7, 2016

(54) CACHE-BASED PIPLINE CONTROL METHOD AND SYSTEM WITH NON-PREDICTION BRANCH PROCESSING USING A TRACK TABLE CONTAINING PROGRAM INFORMATION FROM BOTH PATHS OF A BRANCH INSTRUCTION

(76) Inventor: Kenneth Chenghao Lin, Shanghai (CN)

( * ) Notice: Subject to any disclaimer, the term of this patent is extended or adjusted under 35 U.S.C. 154(b) by 1184 days.

(21) Appl. No.: 13/056,979

(22) PCT Filed: Dec. 31, 2010

(86) PCT No.: PCT/CN2010/080619
§ 371 (c)(1),
(2), (4) Date: Jan. 31, 2011

(87) PCT Pub. No.: WO2011/079824
PCT Pub. Date: Jul. 7, 2011

(65) Prior Publication Data
US 2011/0264894 A1 Oct. 27, 2011

Related U.S. Application Data

(63) Continuation of application No. PCT/CN2010/080114, filed on Dec. 22, 2010.

(30) Foreign Application Priority Data

Dec. 25, 2009 (CN) .......................... 2009 1 0247204
Dec. 31, 2009 (CN) .......................... 2009 1 0248053

(51) Int. Cl.
*G06F 9/32* (2006.01)
*G06F 9/38* (2006.01)

(52) U.S. Cl.
CPC ............... *G06F 9/322* (2013.01); *G06F 9/382* (2013.01); *G06F 9/3804* (2013.01); *G06F 9/3806* (2013.01)

(58) Field of Classification Search
CPC . G06F 9/30058; G06F 9/3804; G06F 9/3842; G06F 9/3844; G06F 9/322
USPC .......................................................... 712/235
See application file for complete search history.

(56) References Cited

U.S. PATENT DOCUMENTS

| 4,777,587 | A | * | 10/1988 | Case et al. ..................... 712/235 |
| 5,542,109 | A | * | 7/1996 | Blomgren et al. ............. 712/234 |
| 5,574,871 | A | * | 11/1996 | Hoyt et al. ..................... 712/200 |
| 5,784,711 | A |   | 7/1998 | Chi |
| 5,860,017 | A | * | 1/1999 | Sharangpani et al. .......... 712/23 |
| 5,954,816 | A | * | 9/1999 | Tran et al. ..................... 712/239 |
| 6,012,134 | A | * | 1/2000 | McInerney et al. ........... 711/207 |

(Continued)

*Primary Examiner* — David J Huisman
(74) *Attorney, Agent, or Firm* — Anova Law Group, PLLC

(57) ABSTRACT

A method is provided for controlling a pipeline operation of a processor. The processor is coupled to a memory containing executable computer instructions. The method includes determining a branch instruction to be executed by the processor, and providing both an address of a branch target instruction of the branch instruction and an address of a next instruction following the branch instruction in a program sequence. The method also includes determining a branch decision with respect to the branch instruction based on at least the address of the branch target instruction provided, and selecting at least one of the branch target instruction and the next instruction as a proper instruction to be executed by an execution unit of the processor, based on the branch decision and before the branch instruction is executed by the execution unit, such that the pipeline operation is not stalled whether or not a branch is taken with respect to the branch instruction.

37 Claims, 8 Drawing Sheets

(56) References Cited

U.S. PATENT DOCUMENTS

| | | | |
|---|---|---|---|
| 6,647,489 B1 * | 11/2003 | Col et al. | 712/226 |
| 6,681,318 B2 | 1/2004 | Chaudhry et al. | |
| 7,134,004 B1 * | 11/2006 | Tago et al. | 712/235 |
| 7,620,804 B2 * | 11/2009 | Kuo | 712/235 |
| 2003/0023838 A1 * | 1/2003 | Karim et al. | 712/235 |
| 2007/0288730 A1 | 12/2007 | Luick | |
| 2007/0288731 A1 | 12/2007 | Bradford et al. | |
| 2007/0288732 A1 | 12/2007 | Luick | |
| 2007/0288733 A1 | 12/2007 | Luick | |
| 2007/0288734 A1 | 12/2007 | Luick | |
| 2007/0288736 A1 | 12/2007 | Luick | |

* cited by examiner

CACHE-BASED PIPLINE CONTROL METHOD AND SYSTEM WITH NON-PREDICTION BRANCH PROCESSING USING A TRACK TABLE CONTAINING PROGRAM INFORMATION FROM BOTH PATHS OF A BRANCH INSTRUCTION

TECHNICAL FIELD

The present invention generally relates to computer architecture and, more particularly, to the methods and systems for branch processing.

BACKGROUND ART

A control hazard, also called branching, is a significant factor in losing efficiency of processor pipelining. When processing branch instructions, conventional processors often do not know where to fetch the next instruction after a branch instruction and may have to wait until the branch instruction finishes, leaving the pipeline behind the branch instruction empty. FIG. 1 shows a conventional pipelining structure, and Table 1 shows pipeline stages with respect to a branch instruction.

TABLE 1

| Pipeline stages with a branch instruction (branch taken) | | | | | | | |
|---|---|---|---|---|---|---|---|
| sequence | i | IF | ID | EX | MEM | WB | |
| | i + 1 | | IF | stall | stall | stall | |
| | target | | | IF | ID | EX | MEM |
| | target + 1 | | | | IF | ID | EX |
| | target + 2 | | | | | IF | ID |
| Instr. Addr. | | i | i + 1 | target | target + 1 | tareget + 2 | target + 3 | target + 4 |
| Instr. Fetched | | | i | i + 1 | target | target + 1 | target + 2 | target + 3 |
| Clock cycles | | 1 | 2 | 3 | 4 | 5 | 6 | 7 |

Considering FIG. 1 and Table 1 together, columns in table 1 represent clock cycles in the pipeline, and rows represent instructions in sequence. Instruction address (Inst. Addr.) is the address provided to an instruction memory for fetching instructions, and the output of the instruction memory is then provided to a decoder for decoding the fetched instruction. The pipeline includes instruction fetch (IF), instruction decode (ID), execution (EX), memory access (MEM), and write back (WB). Stall means the pipeline is stopped or empty.

Table 1 shows a branch instruction, as indicated by 'i', being fetched at clock cycle '1'. Further, 'i+1' indicates the instruction following the branch instruction, "target" indicates a branch target instruction of the branch point, and 'target+1', 'target+2', 'target+3', and 'target+4' indicate instructions following the branch target instruction in sequence.

As shown in Table 1, at clock cycle '2', the processor fetches the branch instruction 'i'. At clock cycle '3', the processor fetches instruction 'i+1', and decodes the branch instruction 'i'. Assuming at the end of the decoding stage of the branch instruction, the branch target address is calculated and the branch decision is made. If the branch decision is that of taking the branch then the branch target address is saved as the next address used to fetch the next instruction. At clock cycle '4', the branch target address is fetched and subsequently decoded and executed. From here on, the pipeline processes instructions following the branch target instruction. However, in this scenario, the already-fetched instruction following the branch instruction 'i+1' should not be executed, therefore the pipeline stalls in relate to the 'i+1' instruction. Thus, under this branch taken successfully scenario, one clock cycle stall is introduced to the pipeline, which may cause significant performance decrease in pipeline operation.

TECHNICAL PROBLEM

To reduce the impact on the pipeline efficiency from the branch processing, many static or dynamic branch prediction methods have been developed, such as delay slot, branch prediction buffer, branch target buffer, and trace cache, etc. However, these prediction methods generally make predictions based on previous results of the processor and thus may still suffer from loss of efficiency caused by wrong predictions.

TECHNICAL SOLUTION

The disclosed methods and systems are directed to solve one or more problems set forth above and other problems.

One aspect of the present disclosure includes a method for controlling a pipeline operation of a processor. The processor is coupled to a memory containing executable computer instructions. The method includes determining a branch instruction to be executed by the processor, and providing both an address of a branch target instruction of the branch instruction and an address of a next instruction following the branch instruction in a program sequence. The method also includes determining a branch decision with respect to the branch instruction based on at least the address of the branch target instruction provided, and selecting at least one of the branch target instruction and the next instruction as a proper instruction to be executed by an execution unit of the processor, based on the branch decision and before the branch instruction is executed by the execution unit, such that the pipeline operation is not stalled whether or not a branch is taken with respect to the branch instruction.

Another aspect of the present disclosure includes a pipeline control system for controlling a pipeline operation of a processor. The processor is coupled to a memory containing executable computer instructions. The pipeline control system includes an examining unit, an addressing unit, a branch logic unit, and a multiplexer. The examining unit is configured to determine a branch instruction to be executed by the processor. The addressing unit is coupled to the processor to provide both an address of a branch target instruction of the branch instruction and an address of a next instruction following the branch instruction in a program sequence. Further, the branch logic unit is configured to determine a branch decision with respect to the branch instruction based on at least the address of the branch target instruction provided by the addressing unit. The multiplexer is configured to select at least one of the branch target instruction and the next instruction as a proper instruction to be executed by an execution unit of the processor, based on the branch decision from the branch logic unit and before the branch instruction is executed by the execution unit, such that the pipeline operation is not stalled whether or not a branch is taken with respect to the branch instruction.

Another aspect of the present disclosure includes a method for controlling a pipeline operation of a processor. The processor is coupled to a memory containing executable computer instructions. The method includes determining a branch instruction to be executed by the processor, and providing both an address of a branch target instruction of the branch instruction and an address of a next instruction following the branch instruction in a program sequence. The method also includes fetching both the branch target instruction and the next instruction using the address of the branch target instruction and the address of the next instruction, respectively. Further, the method includes decoding both the fetched branch target instruction and the fetched next instruction, and selecting one of the decoded branch target instruction and the decoded next instruction for the execution unit based on a branch decision from the processor such that the pipeline operation is not stalled whether or not a branch is taken with respect to the branch instruction.

Another aspect of the present disclosure includes a pipeline control system for controlling a pipeline operation of a processor. The processor is coupled to a memory containing executable computer instructions. The pipeline control system includes an addressing unit coupled to the processor to provide both an address of a branch target instruction of a branch instruction and an address of a next instruction following the branch instruction in a program sequence. The pipeline control system also includes a read buffer coupled between the memory and the processor and configured to store at least a branch target instruction of the branch instruction to be executed by the processor. Further, the read buffer includes a selector coupled with the processor to provide the processor with either the branch target instruction or the next instruction when the branch instruction is executed such that the pipeline operation is not stalled whether or not a branch is taken with respect to the branch instruction.

Other aspects of the present disclosure can be understood by those skilled in the art in light of the description, the claims, and the drawings of the present disclosure.

ADVANTAGEOUS EFFECTS

The disclosed systems and methods may provide fundamental solutions to processing branch instructions for pipelined processors. The disclosed systems and methods obtain addresses of branch target instructions in advance of execution of corresponding branch points and use various branch decision logic arrangements to eliminate the efficiency loss due to incorrectly predicted branch decisions. Other advantages and applications are obvious to those skilled in the art.

BEST MODE

Figure 3:
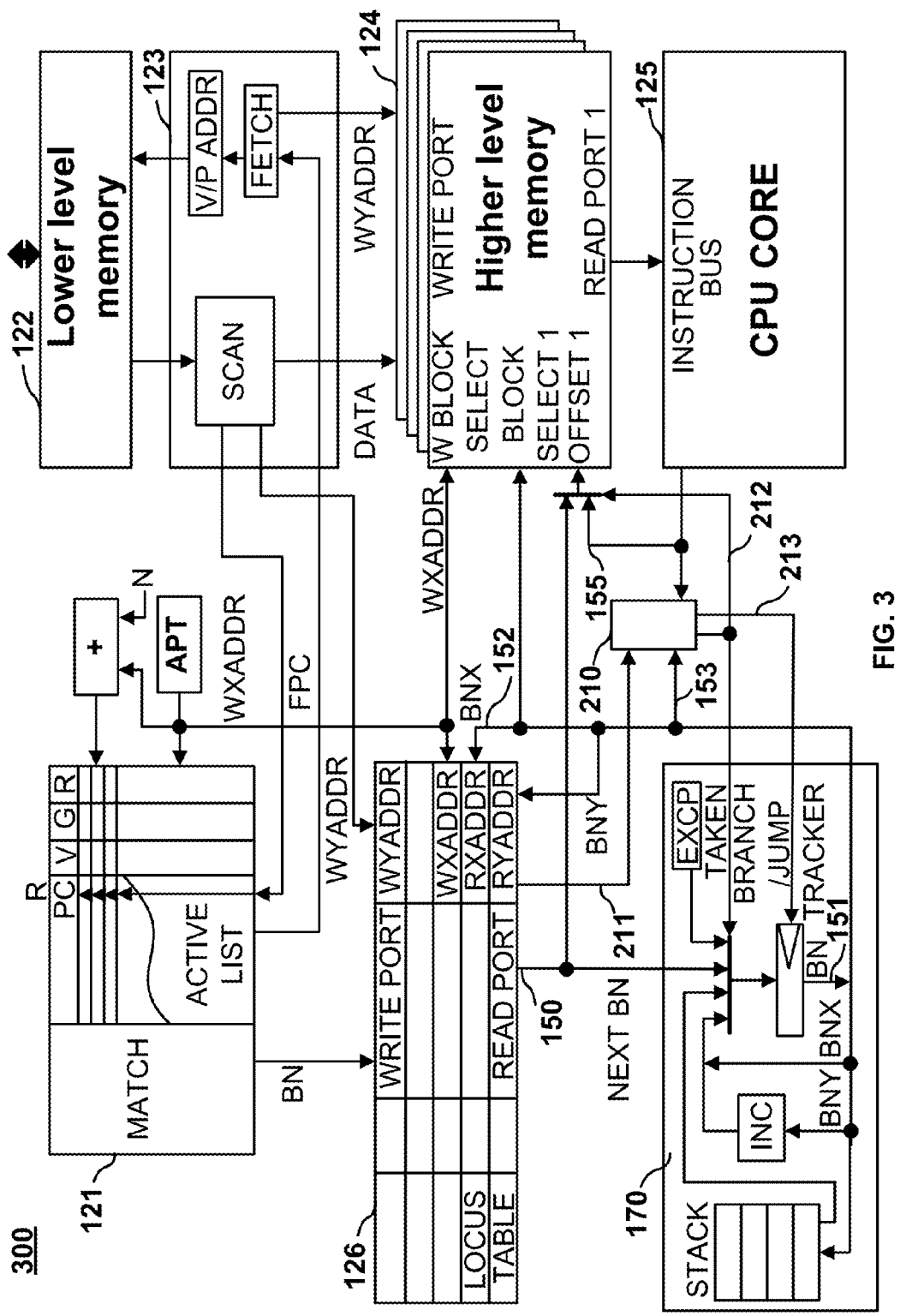
FIG. 3 illustrates an exemplary processor environment consistent with the disclosed embodiments.

FIG. 3 illustrates an exemplary preferred embodiment(s).

MODE FOR INVENTION

Reference will now be made in detail to exemplary embodiments of the invention, which are illustrated in the accompanying drawings. The same reference numbers may be used throughout the drawings to refer to the same or like parts.

Figure 2:
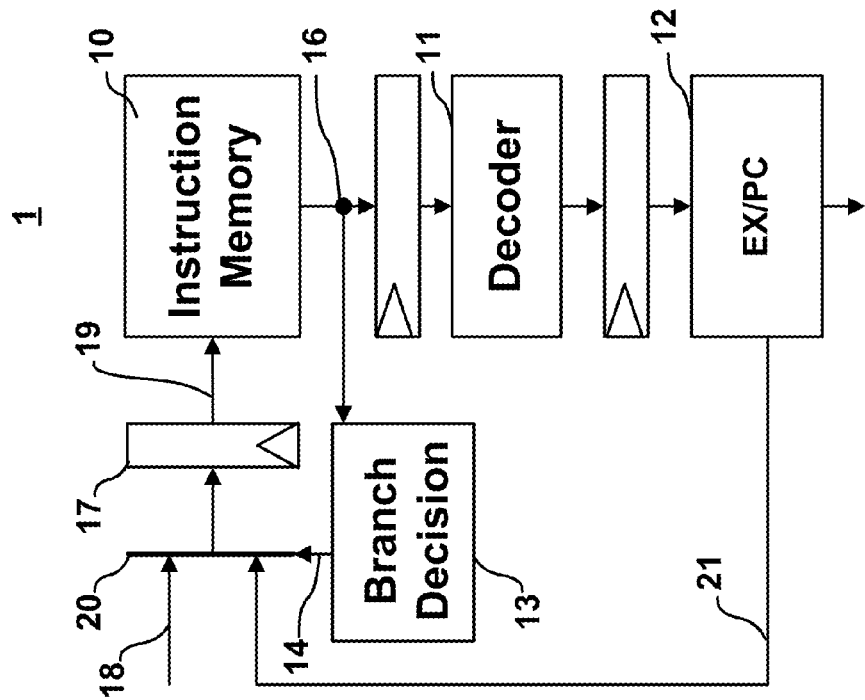
FIG. 2 illustrates an exemplary pipeline control structure consistent with the disclosed embodiments.
Figure 1:
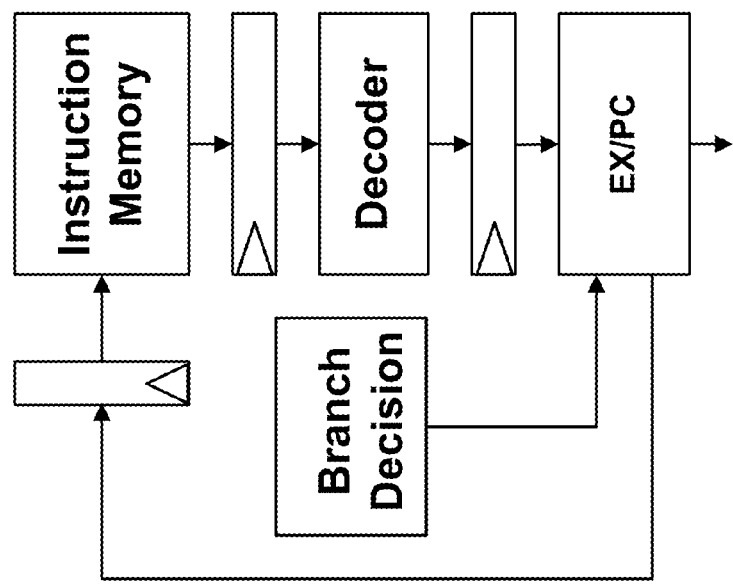
FIG. 1 illustrates a conventional pipeline control structure.

FIG. 2 shows an exemplary pipeline control structure 1 consistent with the disclosed embodiments. For illustrative purposes, the pipeline operation includes instruction fetch (IF), instruction decode (ID), execution (EX), memory access (MEM), and write back (WB). Other pipeline structures may also be used. As shown in FIG. 2, an instruction memory (or instruction cache) 10 stores instructions to be fetched via instruction bus 16 to decoder 11. Decoder 11 decodes the fetched instructions and also prepares operands for operation. The decoded instructions and operands, if any, are provided to execution and program count unit 12 (EX/PC) for execution and calculating the next instruction address 21 in a program sequence. The next instruction address 21 is further provided as an input to multiplexer 20.

At the same time, if a fetched instruction is a branch point, an address for the branch target instruction of the branch point is determined in advance of the program count, as explained in details in later sections. The determined address of the branch target instruction is then provided as another input 18 to multiplexer 20. Further, a branch decision unit 13 provides a branch control signal 14 to multiplexer 20 before the branch instruction is executed by the execution unit 12. Branch control signal 14 may be made based on a branch type and a branch condition (or a condition flag). Branch control signal 14 determines which input should be used by multiplexer 20 to output to register 17 and to address bus 19. This output on bus 19 is then used to fetch next instruction from instruction memory 10.

FIG. 3 shows an exemplary processor environment 300 corresponding to pipeline control structure 1 and incorporating certain aspects of the disclosed embodiments. As shown in FIG. 3, processor environment 300 includes a lower level memory 122, a higher level memory 124, and a CPU core 125. Further, processor environment 300 includes a fill/generator 123, an active list 121, a track table 126, a tracker 170, and a branch decision logic 210 (corresponding to branch decision unit 13 in FIG. 2). It is understood that the various components are listed for illustrative purposes, other components may be included and certain components may be combined or omitted. The various components may be distributed over multiple systems, may be physical or virtual, and may be implemented in hardware (e.g., integrated circuitry), software, or a combination of hardware and software.

Higher level memory 124 and lower level memory 122 may include any appropriate memory devices, such as SRAM, DRAM, and flash memory. As used herein, the level of a memory refers to the closeness of the memory in coupling with a processor core. The closer to the processor core, the higher the level. Further, a memory with a higher level is generally faster in speed while smaller in size than a memory with a lower level. Without limiting, higher level memory 124 may act as a cache for the system or a level one cache, if other caches exist, and may be separated into a plurality memory segments called blocks (e.g., memory blocks) for storing data (i.e., both instructions and data in instruction blocks and data blocks) to be accessed by CPU core 125.

CPU core 125 may include any appropriate processor capable of operating in a pipeline mode and with cache systems. CPU core 125 may use separate caches for instructions and data, and may also include certain instructions for cache operations. For CPU core 125 to execute an instruction, CPU core 125 first needs to read the instruction and/or data from memory. Active list 121, track table 126, tracker 170, and fill/generator 123 are configured to allow CPU core 125 to read the instruction from higher level memory 124 with significantly less cache misses by filling higher level memory 124 with instructions to be executed by CPU core 125, and such filling is also performed independently from history of execution of instructions by CPU core 125. As used herein, the term "fill" means to move data/instruction from a lower level memory to a higher level memory, and the term "memory access" means that CPU core 125 reads from or writes to the closest memory (i.e., higher level memory 124 or level-one cache).

Further, fill/generator 123 may fetch the instructions or the instruction block with the proper address, and may examine every instruction fetched from lower level memory 122 into higher level memory 124 and may extract certain information of the instruction, such as instruction type, instruction address, and branch target information of a branch instruction. The instruction and extracted information including branch target information may be used to calculate instruction addresses provided to other components such as active list 121 and track table 126. A branch instruction or a branch point, as used herein, refers to any appropriate type of instruction which may cause the CPU core 125 to change an execution flow (e.g., executing an instruction out of sequence). If the instruction block corresponding to the branch target information has not been filled into higher level memory 124, the instruction block is filled into higher level memory 124 for possible execution by CPU core 125, while the corresponding track is being built. The tracks in track table 126 and memory blocks in higher level memory 124 may be one to one corresponded and both pointed by the same pointer 152. Any instruction to be executed by CPU core 125 may be filled in higher level memory 124 before it is executed by CPU core 125.

Based on the instruction and branch target information, fill/generator 123 may determine addressing information such as instruction type, branch source address, and branch target address information. For example, an instruction type may include conditional branch instruction, unconditional branch instruction, and other instructions, etc. The instruction type may also include conditional branch sub-type such as branch on equal, branch on larger than etc. Under certain circumstances, unconditional branch may be a special case of conditional branch instruction, with the condition forced to true. The instruction type may thus include branch instruction and other instructions, etc. A branch source address may refer to the address of the branch instruction itself, and a branch target address may refer to the address being branched to if the branch is taken. Other information may also be included.

Figure 4:
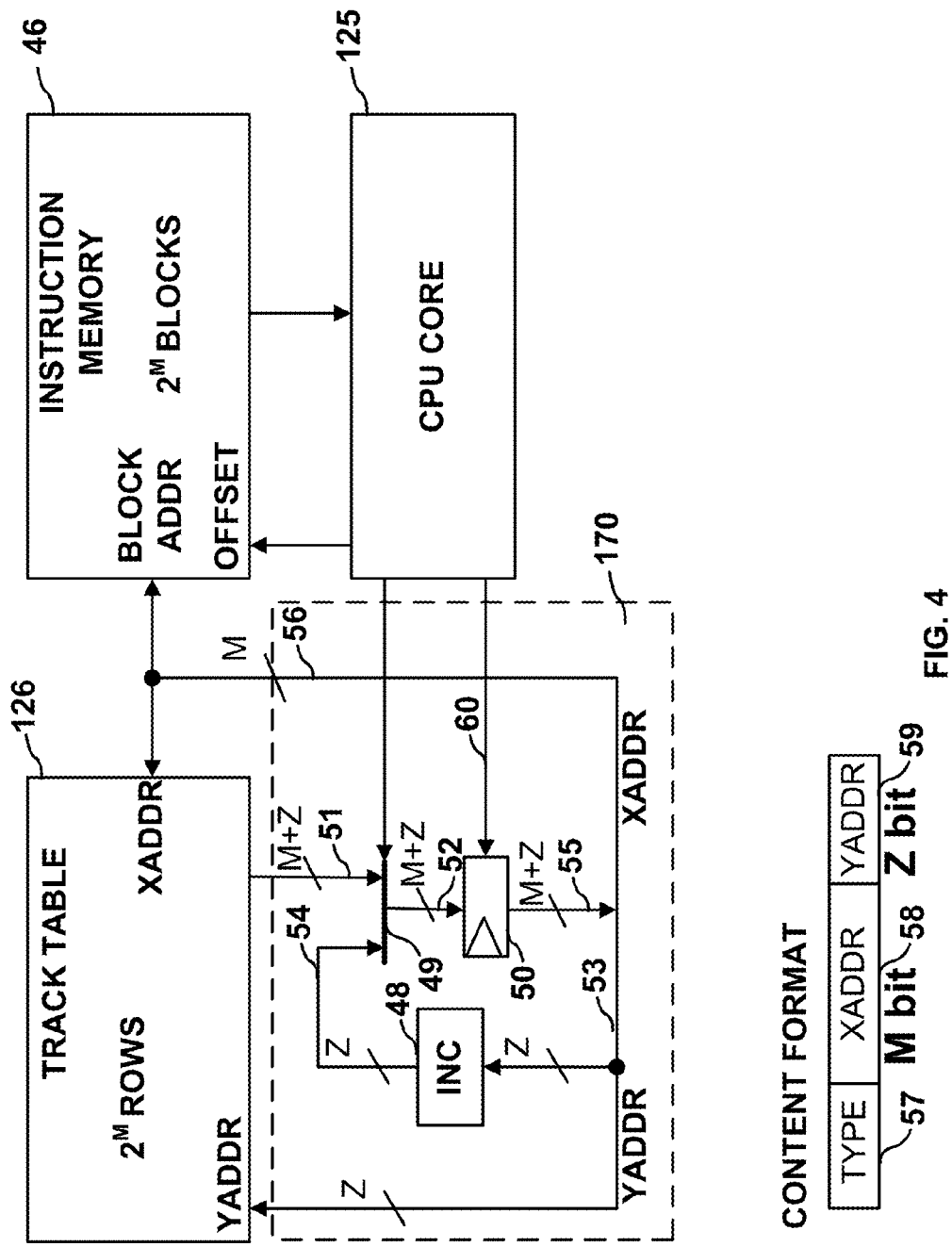
FIG. 4 illustrates an exemplary track table operation consistent with the disclosed embodiments.

Further, a track table may be created based on the determined information to provide addressing information to be used to fill higher level memory 124. FIG. 4 shows an exemplary track table operation consistent with the disclosed embodiments. As shown in FIG. 4, track table 126 and tracker 170 may interact with each other for providing various addresses for cache and branching processing.

Track table 126 may contain tracks of instructions for execution by CPU core 125, and tracker 170 may provide various addresses based on track table 126 and may also provide a read pointer for track table 126. As used herein, a track refers to a representation of a series of instructions (e.g., an instruction block) to be executed. The representation may include any appropriate type of data, such as addresses, block numbers, or other numbers. Further, a new track may be created when a track includes a branch point with a branch target which changes program flow or with an instruction followed by another instruction from a different instruction block, such as an instruction from a next instruction block, an exception program, or a different program thread, etc.

Track table 126 may include a plurality of tracks, and each track in track table 126 corresponds to a row in track table 126 with a row number or a block number (BN), which may index the corresponding memory block. A track may include a plurality of track points, and a track point may correspond to a single instruction or multiple instructions. Further, as a track corresponds to a single row in track table 126, a track point corresponds to a single entry (e.g., a storage unit) from the row in track table 126. The total track points in a track thus may equal to the total number of entries in one row of track table 126. Other configurations may also be used.

A track point (i.e., a single entry in the table entry) may include information about an instruction in within a track, such as a branch instruction. Thus, content of a track point may include information about a type of the corresponding instruction, and a branch target address. By checking the contents of a track point, a branch target point may be determined based on the branch target address.

For example, as shown in FIG. 4, CPU core 125 may use a (M+Z) bit instruction address to read instructions for operation, where M and Z are integers. The M-bit part of the address may be referred as an upper address, and the Z-bit part of the address may be referred as an offset address. Track table 126 may then include $2^M$ rows, with a total $2^M$ tracks, and the upper address may be used as an index to address track table 126. Each row may include $2^Z$ tracks entries, with a total $2^Z$ track points, and the offset address may be used as an offset to address the corresponding row to determine a particular track point.

Further, each entry or track point in the row may have a content format including a type field 57, an XADDR field 58, and a YADDR field 59. Other fields may also be included. Type field 57 may indicate the type of instruction corresponding to the track point. As previously explained, an instruction type may include conditional branch instruction, unconditional branch instruction, and other instructions. The instruction type may also include conditional branch sub-type such as branch on equal, branch on larger than etc. XADDR field 58 may include M bit address also called a first-dimension address or simply a first address. YADDR field 59 may include Z bit address also called a second-dimension address or simply a second address.

When a new track including a branch point (a branch track point) is to be created, the new track may be created at an available row of track table 126 and the branch track point may be created at an available entry of the row. The positions of the row and entry are determined by the source address (i.e., the branch source address) of the branch point. For example, the row number or block number may be determined based on the upper address of the branch source address, and the entry may be determined based on the offset address of the branch source address.

Further, the content of the new track point may correspond to the branch target instruction. In other words, the content of the branch track point stores the branch target address information. For example, the row number or block number of a particular row in track table 126 corresponding to the branch target instruction is stored as the first address in the branch track point. Further, an offset address represents the position of the branch target instruction in the track, and the offset is then stored as the second address in the branch track point. That is, in the content of a branch point, the first address is used as a row address and the second address is used as a column address for addressing the branch target point within the row.

Instruction memory 46 may be a part of higher level memory 124 used for instruction access and may include any appropriate high performance memory. Instruction memory 46 may include $2^M$ memory blocks, and each memory block may include $2^Z$ bytes or words of storage. That is, instruction memory 46 may store all instructions addressed by M and Z (i.e., the instruction address) such that M bits can be used to address a particular memory block while Z bits can be used to address a particular byte or word within the particular memory block.

Tracker 170 may include various components or devices, such as registers, selectors, stacks and/or other storages, to determine a next track to be executed by CPU core 125. Tracker 170 may determine the next track based on the current track, track point information from track table 126, instruction type, and/or whether a branch is taken by CPU core 125, etc.

For example, during operation, when CPU core 125 executes the branch instruction, bus 55 carries the instruction address of the branch instruction with (M+Z) bits. M bits are put onto bus 56 to be provided to track table 126 as the first address or XADDR (or X address), and Z bits are put onto bus 53 to be provided to track table 126 as the second address or YADDR (or Y address). Based on the first address and the second address, track table 126 can find the branch instruction entry, and may also provide the branch target address of the branch instruction onto bus 51.

If the condition of the branch instruction is not satisfied, the branch is not taken, selector 49 may be used to select the YADDR on bus 53 increased by one (1) byte or word by incrementer 48 as the new second address 54, while the first address is unchanged, and may output the new address on bus 52. Based on a control signal 60 from CPU core 125 (e.g., an unsuccessful branch), register 50 keeps the first address unchanged while the incrementer 48 keeps increasing the second address by one (1) until a next branch instruction in the current track table row is reached.

On the other hand, if the condition of the branch instruction is satisfied, the branch is taken, selector 49 may select the branch target address stored in the content of the track entry of the branch point and provided on bus 51 as the output on bus 52. Based on control signal 60 from CPU core (e.g., a successful branch), register 50 keeps the changed first address corresponding to the new track, and the new address (M+Z) is also provided onto bus 55.

Thus, for memory addressing purposes, a block address is provided by track table 126 and tracker 170 while CPU core 125 only supplies an offset. CPU core 125 feeds back branch instruction execution status to enable tracker 170 to make operation decisions.

Before a new track is executed, the instruction block corresponding to the track is filled into instruction memory 46. This process is repeated such that all instructions can be executed by CPU core 125 without a cache miss.

Returning to FIG. 3, to improve efficiency and reduce memory size, active list 121 may be provided to store any established track information, and create a mapping between an address (or a part of the address) and a block number such that tracks in track table 126 can use any available rows. For example, when creating a track, all branch target address information of branch points in the track is stored in the active list 121. Thus, the active list 121 may store mapping information of all tracks of branch target points in a program. Other arrangement may also be used.

That is, active list 121 may be used to store block numbers of instruction blocks in higher level memory 124. Block number is also corresponding to row number of track table 126. During examining process, the block number of a branch target address may be obtained by a content matching between the address and the entries of active list 121. The matched result, i.e., the block number (the first address in previous description), may then be used, together with an offset of the instruction in the track (the second address in previous description), to determine a position of a track point.

If there is no match, it means that a track corresponding to the address has not been established. Then a block number is assigned by active list 121 and the instruction block corresponding to the address is filled into higher level memory 124 indexed by the block number, a new track corresponding to the block number is created in track table 126, such that the active list 121 can indicate the established track and the associated address. Therefore, the above explained operations of active list 121, and fill/generator 123 may be able to fill the instruction block corresponding to a branch target instruction of a branch point into the cache memory 124 (i.e., higher level memory 124) in advance of the branch point is fetched and executed by CPU core 125.

Thus, track table 126 may be configured as a two dimensional table, in which each row, addressable by first address BNX, is corresponding to one memory block or memory line, and each column, addressable by second address BNY, is corresponding to the offset of the corresponding instruction (data) within memory blocks. In short, the track table write-address corresponds to the instruction source address. Further, for a particular branch source address, a BNX is assigned by active list 121 based on the upper address, and BNY is the same as the offset. The BNX and BNY may then form the write-address used to point to a table entry for writing.

Further, when instructions are being filled into higher level memory 124, the branch target addresses of all branch instructions are calculated as a summation of the address of the branch instruction and a branch offset of the branch target instruction. The branch target address (upper address, offset) is sent to active list 121 to match the upper address part, and active list 121 may assign a BNX. The assigned BNX, together with the instruction type from generator 130 and the offset (BNY), form the content of the track table entry of each branch instruction. The content is stored in the branch point addressed by the corresponding write-address.

In addition, tracker 170 may be configured to provide a read pointer 151 to track table 126. Read pointer 151 may also be in the format of BNX and BNY. The content of the track table entry pointed by the read pointer is read out and examined by tracker 170, along with BNX and BNY of the entry point (source BNX and source BNY). Tracker 170 may perform several different read pointer update based on the content. For example, if the entry is not a branch point, tracker 170 may update the read pointer as $BNX_{next}=BNX_{source}$, and $BNY_{next}=BNY_{source}+1$.

If the entry is a conditional branch, tracker 170 may wait for a control signal (TAKEN) provided by CPU core 125 with respect to the branch point when the branch instruction is being executed. If the control signal indicates the branch is not taken, tracker 170 may update the read pointer as $BNX_{next}=BNX_{source}$, and $BNY_{next}=BNY_{source}+1$. However, if the branch is taken, tracker 170 may update the read pointer as $BNX_{next}=BNX_{target}$, and $BNY_{next}=BNY_{target}$.

If the entry is an un-conditional branch (or jump), tracker 170 may treat this type of instruction as a taken conditional branch, and thus may update the read pointer as $BNX_{next}=BNX_{target}$, and $BNY_{next}=BNY_{target}$, when the branch instruction is being executed.

Tracker 170 together with track table 126 and active list 121 may perform operation based on the tracks. Thus, address information of the branch instruction, branch target instruction, and the instruction next to the branch instruction is determined in advance. Such information may then be used by pipeline control structure 1 to process the branch operation without any pipeline stall.

More particularly, as shown in FIG. 3, when read pointer 151 reaches a branch point, tracker 170 receives the branch target address on bus 150 from track table 126. The upper address of the branch target address ($BNX_{target}$) is provided as an input of a multiplexer, while the other input is the current BNX (upper address of BN 151, or $BNX_{source}$). The output of the multiplexer is $BNX_{next}$. Further, the offset of the branch target address ($BNY_{target}$) is provided as an input of another multiplexer, while the other input is PC offset 155 provided by CPU core 125. The output of the multiplexer used as address "OFFSET 1" to higher level memory 124 to index instructions within a cache block determined by BNX 152.

The read pointer 151 (BNX 152, BNY 153) runs faster than PC (e.g. tracker 170 operates on a higher clock frequency, etc.). The read pointer 151 moving along a track stops when the read-out content of the track table 126 indicates a branch instruction with the target address (BNX and BNY), waiting for CPU core 125 to execute the branch point, and waiting for the control signals from branch decision logic 210, a 'TAKEN' signal 212, and a 'BRANCH/JUMP' signal 213. CPU core 125 provides a PC offset 155 to address instructions in higher level memory 124, and tracker 170 provides BNY 153 to address branch point in track table 126. These two signals are also sent to branch decision logic 210 for comparison. If PC offset 155 is the same as BNY 153, it indicates that CPU core 125 is fetching the branch point. That is, the matching of BNY 153 and PC offset 155 can be used to control timing of branching processing such that the branch decision logic 210 starts making a branch decision when PC offset 155 is equal to offset BNY 153. Alternatively, branch processing may start when PC offset 155 comes within a predetermined number of instructions from BNY 153.

When PC offset 155 equals to or comes within a predetermined number of instructions from BNY 153, CPU core 125 is fetching the branch point. Branch decision logic 210 may make a judgment on whether the branch is taken or not. In certain embodiments, a branch decision is made based on a branch type and a branch condition (or a condition flag). The branch type 211 (from track table 126) may indicate a particular type of branch instruction, such as branch if the branch condition is equal to zero or branch if the branch condition is greater than zero, etc. The branch condition is generated by CPU operation from CPU core 125. The branch condition of a particular branch instruction may be available from CPU core 125 at various pipeline stages depending on a particular CPU structure, branch instruction, and/or pipeline operation, etc.

Branch decision logic 210 may include any appropriate circuitry to determine a branch decision. As explained above, branch decision logic 210 may make the branch decision when the PC offset on 155 equals to or in a certain relationship with (e.g. one larger than) the BNY 153, which may signify that the condition flag is ready. The result of branch decision logic 210 is then provided as control signals 'TAKEN' signal 212, and 'BRANCH/JUMP' signal 213. The BRANCH/JUMP signal indicates to tracker 170 that CPU core 125 has reached the branch instruction and enables the updating of read pointer 151. The TAKEN signal is the true will of the program being executed and the correct next address has been selected.

Thus, upon detecting this BRANCH/JUMP signal, if the branch is not taken, $BNX_{next}=BNX_{source}$, and $BNY_{next}=BNY_{source}+1$, thus the unchanged BNX 152 ($BNX_{source}$) is selected and provided to "BLOCK SELECT 1" and an offset for the next instruction (PC offset 155) from CPU core 125 is selected and provided to "OFFSET 1" to address the next instruction following the branch instruction. However, if the branch is taken, $BNX_{next}=BNX_{target}$, and $BNY_{next}=BNY_{target}$, thus the changed BNX 152 ($BNX_{target}$) is selected and provided to "BLOCK SELECT 1" and an offset of the branch target instruction ($BNY_{target}$) from track table 126 is selected and provided to "OFFSET 1" to address the target instruction of the branch instruction. Thus, address information of the branch target instruction is provided by track table 126, address information of the instruction next to the branch instruction is provided by PC, and the information of branch decision is determined by branch decision logic 210 in advance based on branch type information from track table 126 and branch condition flag from CPU core 125.

Therefore, if the branch is taken, the proper address for CPU core 125 to fetch the branch target instruction ($BNX_{target}$ 152, $BNY_{target}$ 150) is already provided to higher level memory 124 on ports 'BLOCK SELECT 1' and "OFFSET 1". Thus, CPU core 125 continues the pipeline operation without delay. Table 2 shows a pipeline stage diagram of branch taken or successful scenario. In Table 2, the row marked as "Instr. Addr." is the instruction memory address as it appears at the "BLOCK SELECT 1" (the upper address) and "OFFSET 1" (the lower address) of higher level memory 124, and the row marked "Instr. Fetched" is the instruction that appears on the "READ PORT 1" of higher level memory 124. This assumes a one clock cycle delay from instruction address being available to the instruction being available. Further, instruction 'i' is the branch instruction, and 'target' is the branch target instruction, 'target+1' is the next instruction following the branch target instruction, and so on.

TABLE 2

Pipeline stage diagram (branch taken)

| Sequence | I | IF | ID | EX | MEM | WB | |
|---|---|---|---|---|---|---|---|
| | Target | | IF | ID | EX | MEM | WB |
| | target + 1 | | | IF | ID | EX | MEM |
| | target + 2 | | | | IF | ID | EX |
| | target + 3 | | | | | IF | ID |

TABLE 2-continued

Pipeline stage diagram (branch taken)

| | | | | | | |
|---|---|---|---|---|---|---|
| Instr. Addr. | i | target | target + 1 | tareget + 2 | target + 3 | target + 4 |
| Instr. Fetched | | i | target | target + 1 | target + 2 | target + 3 |
| Clock cycles | 1 | 2 | 3 | 4 | 5 | 6 | 7 |

On the other hand, if the branch is not taken, the proper address for CPU core 125 to fetch the next instruction following the branch point (BNX$_{source}$ 152, PC offset 155) is also already provided to higher level memory 124 on ports 'BLOCK SELECT 1' and "OFFSET 1". Thus, CPU core 125 continues the pipeline operation without delay. Further, based on the control signals, tracker 170 may use the read pointer to obtain a next branch point to continue branch processing, as previously explained. Table 3 shows a pipeline stage diagram of branch not taken or unsuccessful scenario. Instruction 'i' is the branch instruction, 'i+1' is the next instruction following the branch instruction, and so on.

TABLE 3

Pipeline stage diagram (branch not taken)

| Sequence | I | IF | ID | EX | MEM | WB | |
| --- | --- | --- | --- | --- | --- | --- | --- |
| | i + 1 | | IF | ID | EX | MEM | WB |
| | i + 2 | | | IF | ID | EX | MEM |
| | i + 3 | | | | IF | ID | EX |
| | i + 4 | | | | | IF | ID |
| Instr. Addr. | i | i + 1 | i + 2 | i + 3 | i + 4 | | |
| Instr. Fetched | | i | i + 1 | i + 2 | i + 3 | i + 4 | |
| Clock cycles | 1 | 2 | 3 | 4 | 5 | 6 | 7 |

Figure 5B:
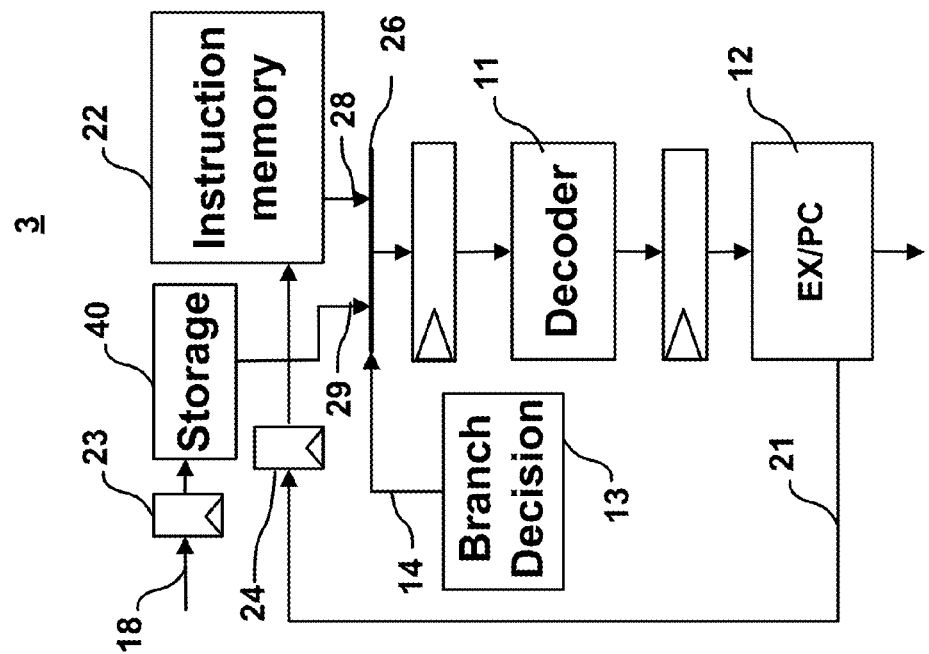
FIG. 5B illustrates another exemplary pipeline control structure consistent with the disclosed embodiments.
Figure 5A:
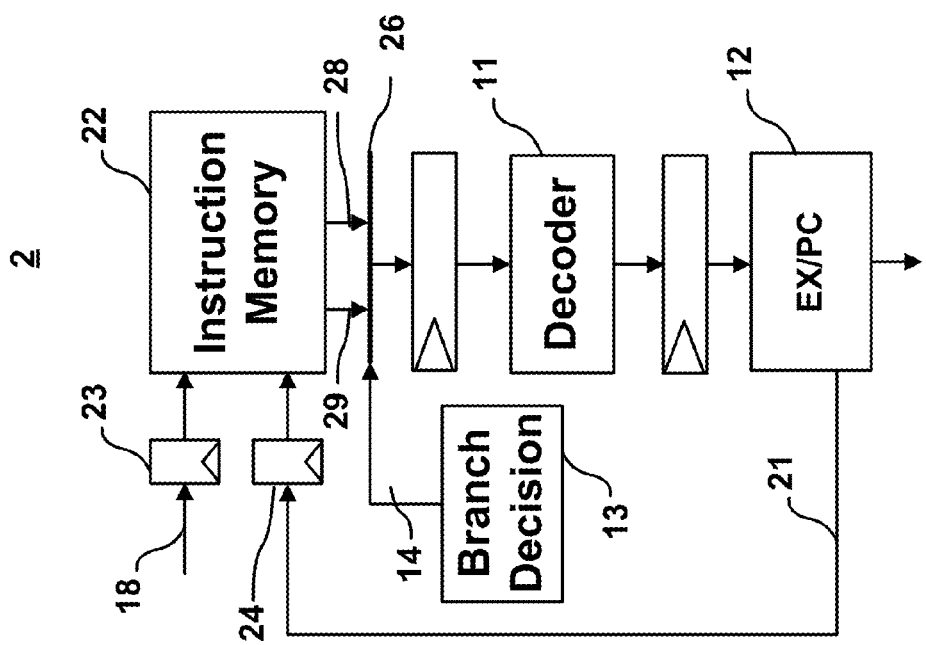
FIG. 5A illustrates another exemplary pipeline control structure consistent with the disclosed embodiments.

FIG. 5A shows another exemplary pipeline control structure 2 consistent with the disclosed embodiments. As shown in FIG. 5A, decoder 11 decodes the fetched instructions and also prepares operands for operation. The decoded instructions and operands, if any, are provided to execution and program count 12 (EX/PC) for execution and calculate the next instruction address 21 in a program sequence. However, different from pipeline control structure 1 as described in FIG. 2, the next instruction address 21 and a branch target instruction address 18 are both provided to an instruction memory (or instruction cache) 22 via registers 24 and 23, respectively. Instruction memory 22 may include multiple ports for read/write operations.

Instruction memory 22 may thus include two address ports to input both the next instruction address 21 and the branch target instruction address 18. Upon receiving both the next instruction address 21 and the branch target instruction address 18, instruction memory 22 may provide respective instructions on two output ports 28 and 29. Further, the two instructions on output ports 28 and 29, respectively corresponding to the next instruction address 21 or the branch target instruction address 18, are inputted to multiplexer 26, and branch decision logic 13 may provide a control signal 14 to multiplexer 26 to select one input from ports 28 and 29 to provide an output to decoder 11.

If branch decision logic 13 determines that the branch point is taken, output instruction 29 corresponding to the branch target instruction address 18 is selected to provide to decoder 11. If branch decision logic 13 determines that the branch point is not taken, output instruction 28 corresponding to the next instruction address 21 is selected to provide to decoder 11. Further, because the determination is performed by branch decision logic 13 before the branch point reaches its execution stage or decodes a following instruction, the pipeline does not lose any clock cycle on waiting for the branch decision.

Figure 6:
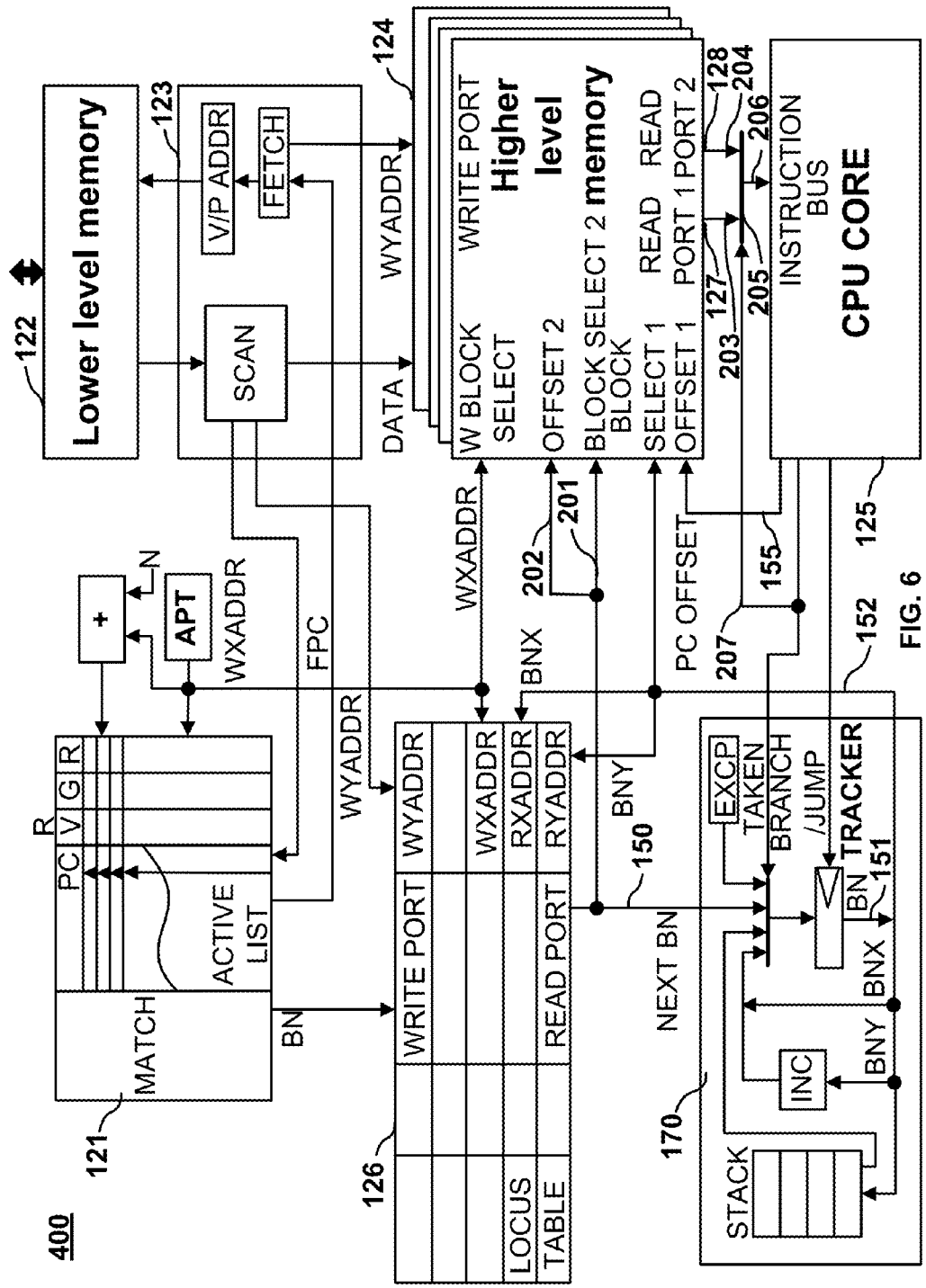
FIG. 6 illustrates another exemplary processor environment consistent with the disclosed embodiments.

FIG. 6 shows an exemplary processor environment 400 corresponding to pipeline control structure 2 and incorporating certain aspects of disclosed embodiments. As shown in FIG. 6, processor environment 400 is similar to processor environment 300 as described in FIG. 3. However, the differences between processor environment 400 and processor environment 300 include that branch decision logic is included in CPU core 125 and higher level memory 124 provides two address ports "BLOCK SELECT 1, OFFSET 1", and "BLOCK SELECT 2, OFFSET 2", and two read ports "READ PORT 1" 127, and "READ PORT 2" 128.

In processing branch instructions, as shown in FIG. 6, track table 126 may provide branch target instruction address as BNX$_{target}$ 201 and BNY$_{target}$ 202 to address port "BLOCK SELECT 2, OFFSET 2." Further, read pointer 151 provides block address of the next instruction BNX 152 to "BLOCK SELECT 1", and CPU core 125 provides offset address of the next instruction on "OFFSET 1."

Upon receiving the branch target instruction address and the next instruction address, higher level memory 124 fetches the respective branch target instruction and the next instruction, and provides the fetched branch target instruction and the next instruction on "READ PORT 2" 128 and "READ PORT 1" 127 respectively, as fetched instruction 204 and fetched instruction 203. Fetched instruction 204 and fetched instruction 203 are also two inputs to multiplexer 205 controlled by control signal 207 (i.e., TAKEN signal from CPU core 125). Further, output 206 from multiplexer 205 is provided to CPU core 125 with the proper fetched instruction based on the TAKEN signal before the fetched instruction is decoded by CPU core 125. If the branch is taken, the fetched branch target instruction is selected, and if the branch is not taken, the fetched next instruction is selected.

CPU core 125 also provides the BRANCH/JUMP signal to indicate to tracker 170 that CPU core 125 has reached the branch instruction and the TAKEN signal is the true will of the program being executed and the correct next address has be selected. Thus, upon detecting this BRANCH/JUMP signal, tracker 170 let the new address appear as BN 151.

If the branch is taken, the fetched instruction 204 corresponding to the branch target instruction (BNX$_{target}$ 201, BNY$_{target}$ 202) is already provided to CPU core 125 as output 206. Thus, CPU core 125 continues the pipeline operation without delay. Of course, if the branch condition is unconditional, the unconditional branch condition may be treated as a special base of a branch point with the condition set to true without further determination. Table 4 shows a pipeline stage diagram of branch taken or successful scenario. In Table 4 the row marked as "Instr. Addr." is the instruction memory address as it appears at the "BLOCK SELECT 1" (the upper address) and "OFFSET 1" (the lower address) of higher level memory 124, and the row marked "Instr. Fetched" is the instruction on output 206 of multiplexer 205.

TABLE 4

Pipeline stage diagram (branch taken)

| Sequence | I | | IF | ID | EX | MEM | WB | |
|---|---|---|---|---|---|---|---|---|
| | Target | | | IF | ID | EX | MEM | WB |
| | target + 1 | | | | IF | ID | EX | MEM |
| | target + 2 | | | | | IF | ID | EX |
| | target + 3 | | | | | | IF | ID |
| Instr. Addr. | | i | i+1 | target + 1 | tareget + 2 | target+ 3 | target + 4 | |
| Read Port 1 | | | i | i + 1 | target + 1 | tareget + 2 | target + 3 | target + 4 |
| Read Port 2 | Target | target | target | target | new target | new target | new target | new target |
| Instr. Fetched | | | i | target | target + 1 | target + 2 | target + 3 | target + 4 |
| Clock cycles | | 1 | 2 | 3 | 4 | 5 | 6 | 7 |

During the branch instruction decoding stage (clock cycle 3), the branch target instruction ("target") is fetched together with the next instruction ("i+1"), from higher level memory 124 and a branch decision is made before the end of this decoding stage. Because both instructions are fetched, whether the branch is taken or not, the proper instruction can be selected to be used in its own decode stage (clock cycle 4). That is, the instruction fetched following a branch point is always a valid instruction, and the pipeline does not have to stall. Also, "READ PORT 2" is always providing the next branch target instruction in advance, as shown in Table 4.

When the branch is taken, the branch target instruction from "READ PORT 2" is selected at clock cycle 3 being the instruction to send to decode stage at clock cycle 4. Also at the end of clock cycle 3, the address of the instruction next to the branch target instruction (Target+1), not the address of branch target instruction (Target), is forced into program counter (PC) of CPU core 125 (and thus PC OFFSET 155 and OFFSET 1). Tracker 170 output $BNX_{source}$ 152 drives "BLOCK SELECT 1" as usual, because when branch is taken, tracker 170 passes next BN 151, which contains the branch target address information, to BN 152, and thus $BNX_{source}$ 152=$BNX_{target}$. This ensures the next "Target+1" instruction being fetched in clock cycle 4, instead of "Target". Thus, the program flow switches to the branch target without any pipeline stall. Further, the instruction address increases normally until reaching the next branch point address.

On the other hand, if the branch is not taken, the fetched instruction 203 corresponding to the next instruction ($BNX_{source}$ 152, PC offset 155) is provided to CPU core 125 as output 206. Thus, CPU core 125 continues the pipeline operation without stall. Table 5 shows a pipeline stage diagram of branch not taken or unsuccessful scenario.

decode stage at clock cycle 4. From that point on, the instruction address increases normally until reaching the next branch point.

FIG. 5B shows a block diagram of an exemplary pipeline control structure 3 consistent with the disclosed embodiments. Pipeline control structure 3 is an alternative to pipeline control structure 2 described above. The difference between pipeline control structure 2 and pipeline control structure 3 includes an extra storage 40. Storage 40 may include a same number of storage blocks as the number of rows of track table 126, each storage block corresponding to a row in track table 126.

Further, each storage block in storage 40 may include a same number of storage units as the number track points or entries in a row of track table 126. Thus, when a track point is a branch point, the branch target instruction is also stored in a corresponding storage unit in storage 40, in addition to that the memory block corresponding to the branch target instruction is filled in instruction memory 22.

Branch target address 18 is from an entry of track table 126, that is, the content of the entry. The content of the entry is BNX and BNY of corresponding branch target instruction of the entry or the branch track point. Thus, BNX and BNY may be used as indices to find a corresponding branch target instruction stored in storage 40. The selected branch target instruction may be sent to multiplexer 26 via bus 29. Further, as previously explained, the next instruction may be fetched from instruction memory 22 based on next instruction address 21, and the fetched next instruction is also sent to multiplexer 26 via bus 28. Thus, instruction memory 22 in FIG. 5B may be a single-port memory device instead of a dual-port memory device as described in FIG. 5A.

Optionally, the entry of track table 126 corresponding to the branch point may store the branch target instruction itself. That is, the content of the branch track point also contains the

TABLE 5

Pipeline stage diagram (branch not taken)

| Sequence | I | | IF | ID | EX | MEM | WB | |
|---|---|---|---|---|---|---|---|---|
| | i + 1 | | | IF | ID | EX | MEM | WB |
| | i + 2 | | | | IF | ID | EX | MEM |
| | i + 3 | | | | | IF | ID | EX |
| | i + 4 | | | | | | IF | ID |
| Instr. Addr. | | i | i + 1 | i + 2 | i + 3 | i + 4 | i + 5 | |
| Read Port 1 | | | i | i + 1 | i + 2 | i + 3 | i + 4 | i + 5 |
| Read Port 2 | Target | target | target | target | new target | new target | new target | new target |
| Instr. Fetched | | | i | i + 1 | i + 2 | i + 3 | i + 4 | i + 5 |
| Clock cycles | | 1 | 2 | 3 | 4 | 5 | 6 | 7 |

That is, when the branch point is not taken, the next instruction after the branch instruction "i+1" from "READ PORT 1" is selected at clock cycle 3 being the instruction to send to the branch target instruction, in addition to the address and offset of the branch target instruction. Thus, track table 126 may be able to provide the branch target instruction directly to multiplexer 26 to be selected by the control signal 14 from branch decision logic 13. This configuration can be treated as if storage 40 is integrated with track table 126.

Thus, as above explained, because the address of branch target instructions are determined in advance, that is, because the branch target information and the branch type are readily available, the branch decision can be made as soon as the branch condition flag(s) is set by the CPU core operation. Thus, the branch decision may be made earlier than a branch instruction itself reaches its normal execution stage, as the major functions of the branch decision are to compute the branch target address and make branch decision based on branch type from the branch instruction together with the condition flag. Generally, the earlier the branch decision, the less extra hardware resources the implementation needs. Various arrangements are used to make the pipeline continue without any stall during branching processing based on the advance branch determination from branch decision logic 13.

Figure 7:
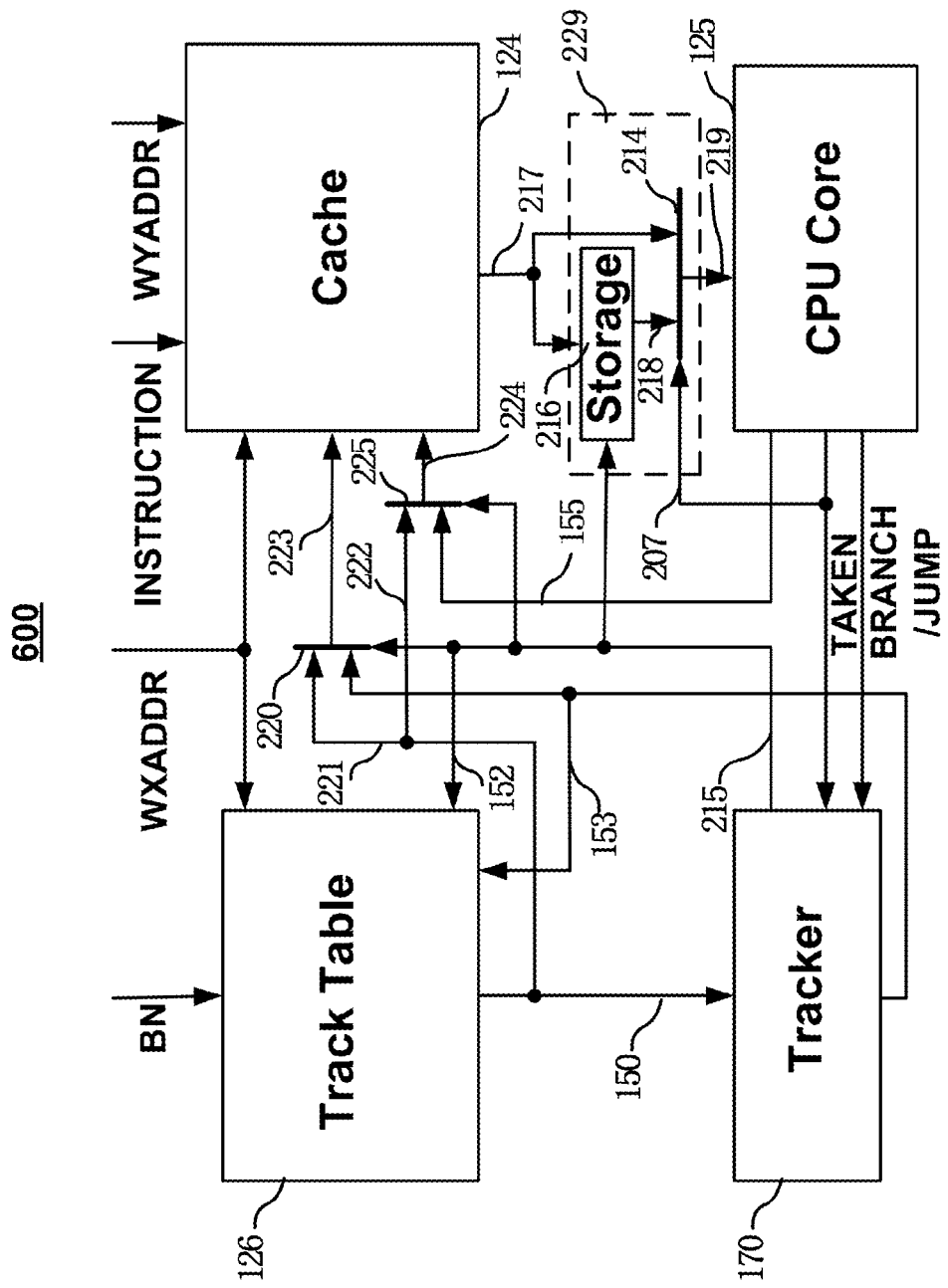
FIG. 7 illustrates another exemplary processor environment consistent with the disclosed embodiments.

FIG. 7 shows an exemplary processor environment 600 incorporating certain aspects of the disclosed embodiments. In processor environment 600, a read buffer is used to provide both a branch target instruction of a branch instruction and a next instruction following the branch instruction in a program sequence to CPU core 125. Processor environment 600 is similar to processor environment 300 in FIG. 3, but with certain differences. As shown in FIG. 7, processor environment 600 includes a read buffer 229, a selector 220, and a selector 225, in addition to cache 124, CPU core 125, track table 126, and tracker 170.

Read buffer 229 is coupled between cache 124 and CPU core 125, and includes a storage module 216 and a selector 214. Storage module 216 is configured to store certain instructions. For example, storage module 216 in read buffer 229 stores and provides either the branch target instruction or the next instruction, while the remaining other one is provided directly by cache 124, such that a higher bandwidth may be achieved with the same cache structure. Selector 214 in read buffer 229 is used to select one of the branch target instruction and the next instruction based on the branch decision, such that the instruction provided to CPU core 125 is the valid or proper instruction after the branch instruction. For example, selector 214 is configured to select either an output from storage module 216 or an output from cache 124 as output 219 to CPU core 125. Further, selector 220 is configured to select either an address from track table 126 or an address from tracker 170 as output 223 to cache 124 (a block address); and selector 225 is configured to select an offset address from track table 126 or a PC (program counter) offset from CPU core 125 as output 224 to cache 124 (an offset address). A control signal 215 from tracker 170 is used to control selectors 220 and 225 and storage module 216, and a 'TAKEN' signal is used to control selector 214.

In operation, tracker 170 provides BNX 152 and BNY 153 such that track table 126 may provide a track point corresponding to the BNX 152 and BNY 153. The content of the track point is read out and may contain information such as an instruction type and a branch target address, etc. The content (e.g., the instruction type and branch target address) may be provided to tracker 170 via bus 150. Further, the upper part (BNX) of the branch target address is provided to selector 220 as one input. The BNY of the branch target address or a part of the BNY (e.g., the two most significant bits) may also be provided to selector 225 via bus 222. The other input to selector 220 may be the BNX provided by tracker 170, and the other input to selector 225 may be the PC offset or a part of the PC offset (e.g., the two most significant bits).

Storage module 216 may include a predetermined number of storage units for storing instructions based on the capacities of other components. For example, if a memory block (e.g., instruction block) includes a total of 16 instructions, BNY and PC offset may have a length of 4 bits. Assuming 4 instructions are fetched from instruction memory or cache 124 in a single clock cycle, storage module 216 may store four instructions, and the two most significant bits of BNY or PC offset may be used to read 4 instructions from the memory block pointed by BNX, and use the two least significant bits of BNY or PC offset to select one instruction from the four instructions that are read out.

A total of four instructions are used for illustrative purposes, any appropriate number of instructions may be fetched in a clock cycle for a single-issue processor or a multi-issue processor. Further, the total number of instructions fetched (e.g., 4) in a single clock cycle may be more than the number of instructions executed by CPU core 125 (e.g., 1) in a single clock cycle. Thus, certain clock cycles may be used to load storage module 216 or fill cache 124 using track table 126 and related components. In certain embodiments, cache 124 may include a single port memory module with a bandwidth is larger than the instruction issue rate of CPU core 125 to support filling storage module 216 by tracker 170 and fetching instructions by CPU core 125.

When tracker 170 detects that an instruction is a branch instruction, tracker 170 stops increasing BNY. When a fetch time slot arrives, the instruction type information may be used as control signal 215 to control storage module 216 as a write-enable signal, and to write the current four instructions outputted from cache 124 into storage module 216 through bus 217. At the same time, based on the instruction type information (e.g., instruction type as branch instruction), signal 215 can control selector 220 to select the BNX of the branch target instruction on bus 221 as the instruction block address, and control selector 225 to select the two most significant bits of the BNY of the branch target address on bus 222 to address the four instructions in the memory block. The four instructions including the branch target address can be read out in next read cycle or clock cycle. Further, the four instructions including the branch target instruction are stored in storage module 216, and the PC offset is again used to read the next instructions. Thus, when CPU core 125 is executing the branch instruction correspond to a branch point, both the branch target instruction and the instruction next to the branch point are provided, such that a correct instruction can be used based on whether the branch is taken or not.

Figure 8:
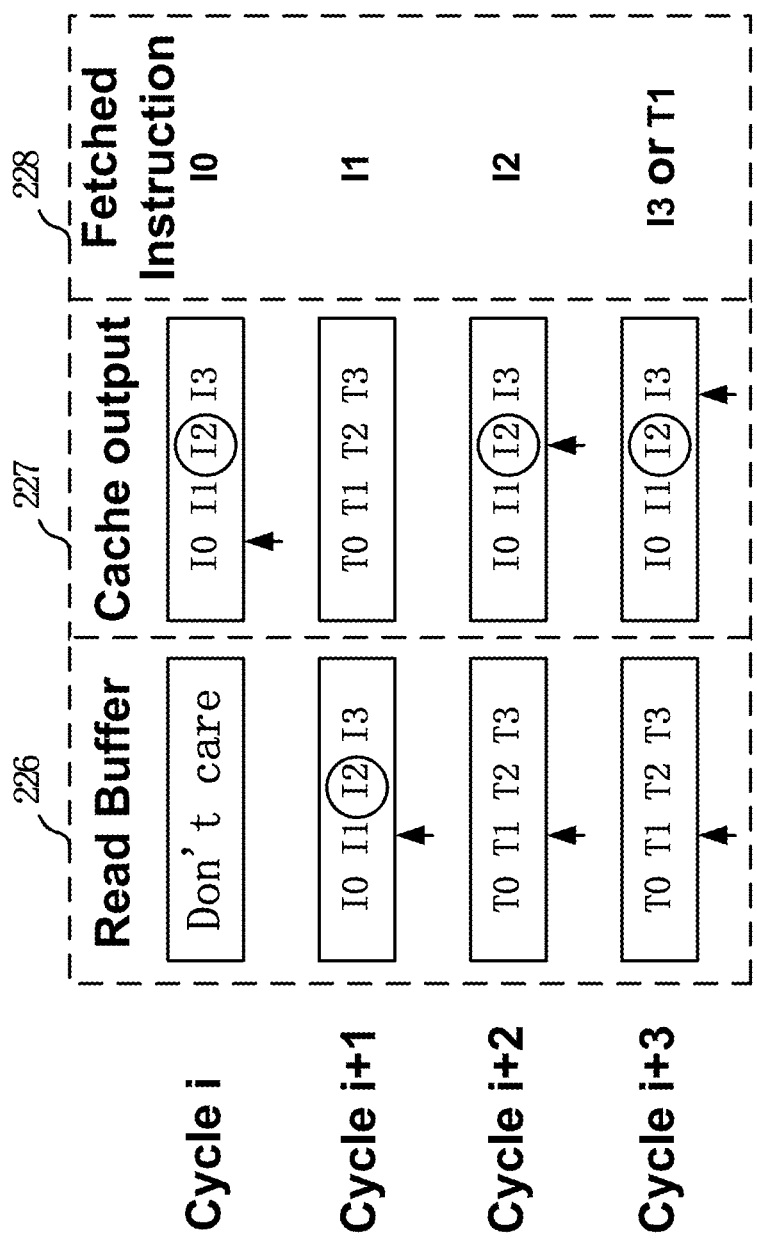
FIG. 8 illustrates exemplary various instruction values in operation consistent with the disclosed embodiments.

FIG. 8 shows exemplary instructions being read out during operation consistent with the disclosed embodiments. As shown in FIG. 8, column 226 shows values on output 218 of storage module 216, column 227 shows values on output 217 of cache 124, and column 228 shows current instruction fetched by CPU core 125. Further, assuming instructions I0, I1, I2, and I3 are four continuous instructions corresponding to the two most significant bits of a same PC offset, and I2 is a branch instruction. Also assuming the branch target instruction of the branch instruction I2 is T1, and instructions T0, T1, T2, and T3 are four continuous instructions corresponding to the two most significant bits of a same PC offset. The rows represent subsequent clock cycles or execution cycles (which may include more than one clock cycles). Four rows are listed as cycle i, cycle i+1, cycle i+2, and cycle i+3. Further, assuming the 'TAKEN' signal (i.e., whether the branch of the branch instruction is taken or not) can be generated in the cycle after the branch instruction is fetched.

At cycle i, assuming PC offset points to I0, when read pointer reaches the track point corresponding to branch instruction I2. In this cycle, selector 214 selects output from cache 124 as output 219, and the two least significant bits of PC offset can be used for to select I0 from the four continuous instructions for CPU core 125. As previously explained, read pointer stops on the branch track point, the four instructions outputted from cache 124 are thus stored in storage module 216, and the branch target address is used as the instruction address for the next cycle (i.e., cycle i+1) to obtain the four instructions including the branch target instruction.

At cycle i+1, storage module 216 stored instructions I0, I1, I2, and I3, while output from cache 124 is instructions T0, T1, T2, and T3. During this cycle i+1, output from storage module 216 is selected as output 219 of selector 214, the two least significant bits may be used to select I1 from the four instructions on bus 219 for CPU core 125. Further, during this cycle i+1, four instructions T0, T1, T2, and T3 are written into storage module 216, and BNX of the track point pointed by the read pointer and the PC offset are used as the address for the instruction (i.e., instruction I2) in next cycle.

At cycle i+2, storage module 216 stores and outputs instructions T0, T1, T2, and T3, and output from cache 124 is instructions I0, I1, I2, and I3. During this cycle, output from cache 124 is selected as output 219 of selector 214, and the two least significant bits of PC offset can be used to select instruction I2 from the four instructions on bus 219 for CPU core 125. The address of the next instruction (i.e., I3) is used as the address for the instruction in next cycle.

At cycle i+3, storage module 216 stores and outputs instructions T0, T1, T2, and T3, and output from cache 124 is instructions I0, I1, I2, and I3. During this cycle, based on whether the branch of branch instruction is taken or not, either output from cache 124 or output from storage module 216 is selected as output 219 of selector 214. Further, also based on whether the branch of the branch instruction is taken or not, the two least significant bits of the PC offset or the two least significant bits of BNY of the branch target address may be used to select I3 or T1, respectively, for CPU core 125.

Thus, the 'TAKEN' signal (i.e., whether the branch of the branch instruction is taken or not) may be used to select between output from cache 124 and output from storage module 216. Alternatively, one instruction can be selected from the four instructions including the branch target instruction and another instruction can be selected from the four instructions including the next instruction, respectively, using the two least significant bits of BNY of the branch target address or the two least significant bits of the PC offset.

Alternatively, instruction I3 and instruction T1 may both be provided to CPU core 125, and CPU core 125 may separately decode instruction I3 and instruction T1 and obtain operands for instruction I3 and instruction T1 simultaneously. Based on whether the branch of the branch instruction is taken or not, CPU core 125 selects one of decoded instruction I3 or decoded instruction T1, with proper operands. More particularly, when the read pointer reaches the track point corresponding to branch instruction I2, if the instruction being fetched by CPU core 125 is near the branch instruction I2, e.g., fetching instruction I1, and after instruction I2 is fetched, cache 124 just starts outputting the four instructions T0, T1, T2, and T3, and storage module 216 stores and outputs four instructions I0, I1, I2, and I3. CPU core 125 can still obtain I3 and T1 from cache 124 and storage module 216, respectively. For example, an exclusive OR logic may be used to reverse the select signal which controls selector 214, to select the branch target instruction or the 4 instructions including the branch target instruction from the output of cache 124, or to select the next instruction or the 4 instructions including the next instruction from the output of storage module 216, respectively. In this case, the four instruction T0, T1, T2, T3 does not need to be stored into storage module 216, no matter whether the branch is taken or not.

Figure 9:
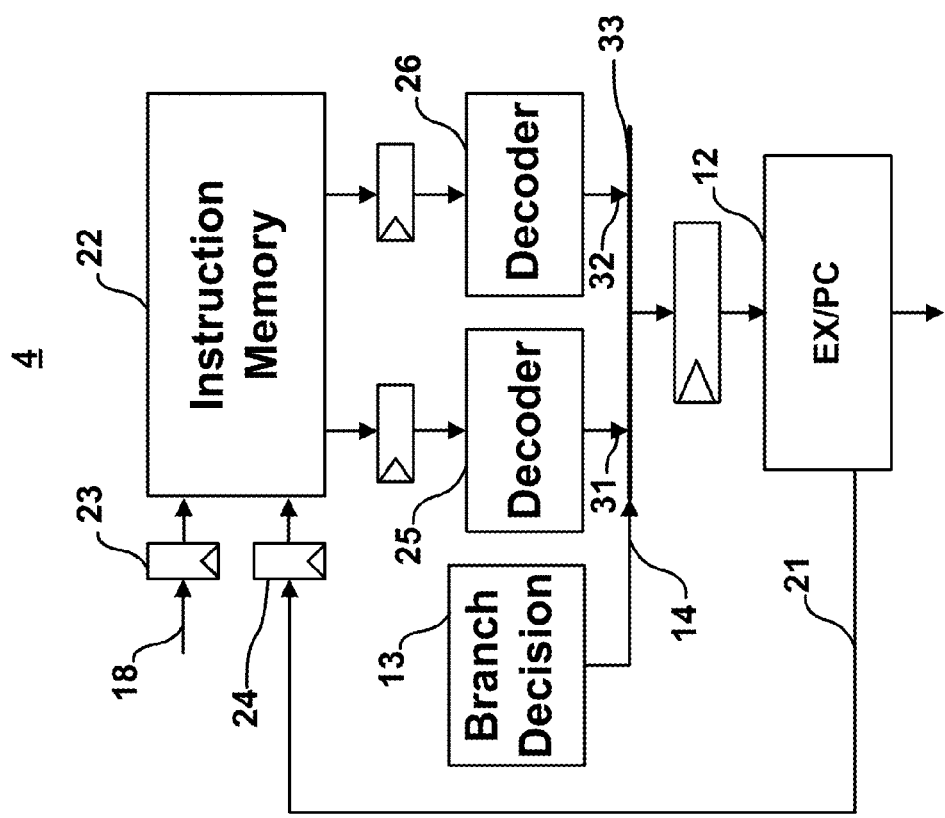
FIG. 9 illustrates another exemplary pipeline control structure consistent with the disclosed embodiments.

Further, FIG. 9 shows another exemplary pipeline control structure 4 consistent with the disclosed embodiments. Pipeline control structure 4 is similar to pipeline control structure 2 as described in FIG. 5. However, the differences between pipeline control structure 4 and pipeline control structure 2 include that two separate decoders, decoder 25 and decoder 26, are provided instead of a single decoder 11. As shown in FIG. 9, two instructions fetched from instruction memory 22 are further decoded by decoder 25 and decoder 26, respectively, as decoded instruction 31 and decoded instruction 32 to be provided to multiplexer 33, which is then selected by control signal 14 from branch decision logic 13.

If branch decision logic 13 determines that the branch point is taken, decoded instruction 32 corresponding to the branch target instruction address 18 is selected to be provided to execution unit 12. If branch decision logic 13 determines that the branch point is not taken, decoded instruction 31 corresponding to the next instruction address 21 is selected to be provided to execution unit 12. Further, because the determination can be performed by branch decision logic 13 at the end of the execution stage of the branch instruction, and before the execution stage of the following instruction, the pipeline does not lose any clock cycle on waiting for the branch result.

That is, branch decision logic 13 may determine a branch decision in a normal pipeline stage, such as at the end of the execution stage of the branch instruction, in addition to determining the branch decision in advance the execution of the branch point. Because all potential instructions to be executed by CPU core 125 following the branch point are already fetched and decoded, and the instruction type is known, no pipeline stall will be introduced by the branch decision.

Further, as illustrated in this disclosure, although CPU core 125 executes one instruction at a time, more than one instruction can be executed by CPU core 125 (i.e., a multi-issue processor) at a time, and the above examples may also be applicable. Similarly, although a 5-stage pipeline operation is illustrated, any number of stages may be included in the pipeline operation with various pipeline structures.

In addition, loss of clock cycle due to branch instruction processing may also be reduced by pre-processing executable instructions or pre-defined instructions. For example, a branch instruction may be combined with a non-branch instruction to form a composite instruction such that the branch instruction may be processed while the non-branch instruction is being processed to reduce the clock cycle cost on the branch instruction to zero or a minimum.

For example, a processor instruction set often includes certain reserved or unused instructions or certain non-branch instruction with reserved or unused portions. These non-branch instructions may be used to include branch condition and branch target address or offset, etc., of a branch instruction. Thus, when executing these non-branch specific instructions, branch condition can be determined and branching can then be performed during the execution of the non-branch specific instructions to achieve zero-cost branching processing. Because branch instructions may be counted as 20% of total executed instructions by a processor, reducing the number of total executed instructions by 20% may significantly increase the performance of the processor.

For example, in a 32-bit (bit) instruction set, one class of 'add' instructions include 5-bit op-code, two source operands and one destination operand in register form and represented by a 4-bit number. Thus, in this class, an 'add' instruction takes a total of 17 bits, and the other 15 bits are not used.

On the other hand, a class of branch instruction determines branch decision by comparing the values of two registers. As an independent instruction, this class of branch instruction may include a 5-bit op-code, 5 bits branch offset, 4 bits each representing a register. Thus, the branch instruction takes a total of 18 bits.

However, when the add instruction and the branch instruction are combined together to form a composite instruction (e.g., add and branch), one bit can be added to the 5-bit op-code to indicate the composite instruction. Thus, this "add and branch" instruction included 6 bits for op-code, 12 bits for three registers used in "add", 8 bits for two registered used in branch, and 5 bits for branch offset, a total of 31 bits. Thus, in this example, the branch instruction can be executed at the same time when the add instruction is executed to achieve zero cost branching processing. This disclosure makes the zero cost branching possible.

In other embodiments with a 32-bit instruction set, certain execution-type instructions (such as ADD, SUB, etc.) may have a 6-bit op-code, and three register addresses of 5 bits each, for a total of 21 bits. Thus, there leaves 11 bits for additional branch operation. This branch operation may be of a fix-type, such as that a branch is taken if the content of a particular register is not zero. One bit of the 11 bits may be called a branch bit, and the other 10 bits may be a branch offset. When the branch bit is set to "0", the instruction is an ordinary execution instruction. When the branch bit is set to "1", the instruction is also a branch instruction besides executing the execution function (ADD, etc.). Further, if register content does not equal to zero, the content is reduced by 1, and the execution is branched to the instruction whose address is the branch offset+the address of this composite instruction. On the other hand, if the register content equals to zero, then branch is not taken, and the instruction next to the composite instruction is executed next. This type of instruction may reduce two clock cycles from a program loop.

The disclosed systems and methods may provide fundamental solutions to processing branch instructions for pipelined processors. The disclosed systems and methods obtain addresses of branch target instructions in advance of execution of corresponding branch points and use various branch decision logic arrangements to eliminate the efficiency loss due to incorrectly predicted branch decisions. Other advantages and applications are obvious to those skilled in the art.

INDUSTRIAL APPLICABILITY

The disclosed devices and methods may be used in various processor-related applications, such as general processors, special-purpose processors, system-on-chip (SOC) applications, application specific IC (ASIC) applications, and other computing systems. For example, the disclosed devices and methods may be used in high performance processors to improve pipeline efficiency

The invention claimed is:

1. A method for controlling a pipeline operation of a processor coupled to a memory containing executable computer instructions, the method including:
determining, in a program sequence, a branch instruction to be executed by the processor, the branch instruction having a branch condition;
determining a branch target instruction of the branch instruction and a next instruction following the branch instruction in the program sequence;
storing both the branch target instruction of the branch instruction and said next instruction following the branch instruction into a cache;
without predicting whether the branch condition is satisfied or not, providing the cache with both a cache address of the branch target instruction of the branch instruction and a cache address of said next instruction following the branch instruction, wherein a cache address is different from a memory address for addressing the memory;
determining a branch decision with respect to the branch instruction; and
selecting one of the branch target instruction and said next instruction as a proper instruction to be executed by an execution unit of the processor, using a corresponding cache address and based on the branch decision such that the pipeline operation is not stalled whether or not a branch is taken with respect to the branch instruction,
wherein the providing further includes:
examining the executable computer instructions to extract instruction information containing at least branch information;
creating a track table containing a plurality of track table rows corresponding to a plurality of tracks based on the extracted instruction information, each table row corresponding to a track representing an instruction block in the program sequence loaded into the cache and including a plurality of entries, each entry corresponding to a track point, which corresponds to at least one instruction in the cache; and
determining the cache address of the branch target instruction based on the plurality of tracks before the branch instruction is executed.

2. The method according to claim 1, wherein:
the branch decision is determined using a branch type and a branch condition flag.

3. The method according to claim 2, further including:
addressing a track point in a specific track by a first address for determining a track number, and a second address for determining an offset within the specific track, wherein the cache is directly addressed by the pair of the first address and the second address.

4. The method according to claim 3, wherein:
the branch type is provided by the track table; and
the branch condition flag is provided by the processor.

5. The method according to claim 3, wherein:
the branch decision is made when a program counter (PC) offset from the processor is equal to the offset of the track point in the specific track corresponding to the branch instruction.

6. The method according to claim 3, further including:
when the processor executes an instruction corresponding to a selected track point, providing the first address to determine a cache block containing the instruction corresponding to the selected track point, wherein the processor provides an offset within the cache block to fetch the instruction corresponding to the selected track point.

7. The method according to claim 6, further including:
calculating the cache address of the branch target instruction as a summation of the first address of a cache block corresponding to the branch instruction, the offset of the branch instruction within the cache block corresponding to the branch instruction, and a branch offset of the branch target instruction.

8. The method according to claim 7, further including:
storing the cache address of the branch target instruction as a content of an entry corresponding to the branch instruction in the track table.

9. The method according to claim 8, further including:
when the branch is taken, providing the first address and the second address from the entry corresponding to the branch instruction in the track table as a next first address and a next second address, respectively; and
when the branch is not taken, keeping a current first address unchanged as the next first address, and increasing a current second address by one as the next second address to reach a next track point in the track table.

10. The method according to claim 8, further including:
when the branch is taken, forcing an address of an instruction following the branch target instruction into a program counter (PC) of the processor such that the processor fetches the instruction following the branch target instruction when executing the branch target instruction.

11. The method according to claim 1, wherein the selecting further includes:
selecting one of the cache address of the branch target instruction and the cache address of said next instruction based on the branch decision; and
fetching one of the branch target instruction and said next instruction from the cache based on the selected one of the cache address of the branch target instruction and the cache address of said next instruction for the execution unit.

12. The method according to claim 1, wherein the selecting further includes:
fetching both the branch target instruction and said next instruction using the cache address of the branch target instruction and the cache address of said next instruction, respectively, from the cache into the processor; and
selecting one of said fetched branch target instruction and said fetched next instruction for the execution unit based on the branch decision.

13. The method according to claim 1, wherein the selecting further includes:
fetching the branch target instruction using the cache address of the branch target instruction from a buffer into the processor;
fetching said next instruction using the cache address of said next instruction from the cache into the processor; and
selecting one of said fetched branch target instruction and said fetched next instruction for the execution unit based on the branch decision.

14. The method according to claim 1, wherein:
the branch instruction is combined with a non-branch instruction such that processing of the branch instruction is performed at the same time when the non-branch instruction is executed.

15. The method according to claim 1, wherein:
causing a read pointer of the track table to move along a given track and to skip through track points between a current position and a next branch instruction track point in the given track in advance of a corresponding branch instruction being executed such that both cache addresses of a target instruction of the corresponding branch instruction and a next instruction of the corresponding branch instruction are provided to the processor.

16. A pipeline control system for controlling a pipeline operation of a processor coupled to a memory containing executable computer instructions, the pipeline control system including:
an examining circuit configured to determine, in a program sequence, a branch instruction to be executed by the processor, the branch instruction having a branch condition, to determine a branch target instruction of the branch instruction and a next instruction following the branch instruction in the program sequence, and to store both the branch target instruction of the branch instruction and said next instruction following the branch instruction into a cache;
an addressing circuit coupled to the processor to, without predicting whether the branch condition is satisfied or not, provide a cache address of the branch target instruction of the branch instruction and a cache address of said next instruction following the branch instruction, wherein a cache address is different from a memory address for addressing the memory;
a branch logic circuit configured to determine a branch decision with respect to the branch instruction based on at least the cache address of the branch target instruction provided by the addressing circuit; and
a multiplexer configured to select one of the branch target instruction and said next instruction as a proper instruction to be executed by an execution unit of the processor, using a corresponding cache address and based on the branch decision from the branch logic circuit such that the pipeline operation is not stalled whether or not a branch is taken with respect to the branch instruction,
wherein:
the examining circuit is further configured to: examine the executable computer instructions to extract instruction information containing at least branch information, and to provide both the cache address of the branch target instruction of the branch instruction and the cache address of said next instruction, and
the addressing circuit is further configured to: based on the extracted instruction information, create a track table containing a plurality of track table rows corresponding to a plurality of tracks, each table row corresponding to a track representing an instruction block in the program sequence loaded into the cache and including a plurality of entries, each entry corresponding to a track point, which corresponds to at least one instruction in the cache, and determine the cache address of the branch target instruction based on the plurality of tracks before the branch instruction is executed.

17. The pipeline control system according to claim 16, wherein:
to select one of the branch target instruction and said next instruction, the multiplexer is configured to select one of the cache address of the branch target instruction and the cache address of said next instruction based on the branch decision; and
the pipeline control system further includes:
a fetching circuit configured to fetch one of the branch target instruction and said next instruction from the cache based on the selected one of the cache address of the branch target instruction and the cache address of said next instruction for the execution unit.

18. The pipeline control system according to claim 16, wherein:
the pipeline control system further includes a fetching circuit configured to fetch both the branch target instruction and said next instruction from the cache using the cache address of the branch target instruction and the cache address of said next instruction, respectively; and to select the one of the branch target instruction and said next instruction, the multiplexer is configured to select one of said fetched branch target instruction and said fetched next instruction for the execution unit based on the branch decision.

19. The pipeline control system according to claim 16, further including:
a fetching circuit and a buffer circuit, wherein:
the fetching circuit is configured to:
fetch the branch target instruction using the cache address of the branch target instruction from the buffer circuit; and
fetch said next instruction from the cache using the cache address of said next instruction, and
the multiplexer is configured to select one of said fetched branch target instruction and said fetched next instruction for the execution unit based on the branch decision.

20. The pipeline control system according to claim 16, wherein:
the branch instruction is combined with a non-branch instruction such that processing of the branch instruction is performed at the same time when the non-branch instruction is executed.

21. The pipeline control system according to claim 16, wherein:
the branch instruction is a part of a composite instruction containing both the branch instruction and a non-branch instruction in a single instruction.

22. The pipeline control system according to claim 21, wherein:
the composite instruction includes a branch bit indicating that the branch instruction in the composite instruction is to be executed; and the branch decision with respect to the branch instruction in the composite instruction is based on a content of a predetermined register.

23. The pipeline control system according to claim 21, wherein:
the composite instruction includes a bit flag in an op-code of the composite instruction indicating that the composite instruction is a composite instruction instead of a non-composite instruction.

24. The pipeline control system according to claim 16, further including:
a tracker circuit for causing a read pointer of the track table to move along a given track and to skip through track points between a current position and a next branch instruction track point in the given track in advance of a corresponding branch instruction being executed such that both cache addresses of a target instruction of the corresponding branch instruction and a next instruction of the corresponding branch instruction are provided to the processor.

25. A method for controlling a pipeline operation of a processor coupled to a memory containing executable computer instructions, the method including:
determining, in a program sequence, a branch instruction to be executed by the processor, the branch instruction having a branch condition;
determining a branch target instruction of the branch instruction and a next instruction following the branch instruction in the program sequence;
storing both the branch target instruction of the branch instruction and said next instruction following the branch instruction into a cache;
without predicting whether the branch condition is satisfied or not, providing the cache with both a cache address of the branch target instruction of the branch instruction and a cache address of said next instruction following the branch instruction, wherein a cache address is different from a memory address for addressing the memory;
fetching both the branch target instruction and said next instruction using the cache address of the branch target instruction and the cache address of said next instruction, respectively;
decoding both said fetched branch target instruction and said fetched next instruction; and
selecting one of said decoded branch target instruction and said decoded next instruction for an execution unit based on a branch decision from the processor such that the pipeline operation is not stalled whether or not a branch is taken with respect to the branch instruction,
wherein the providing further includes:
examining the executable computer instructions to extract instruction information containing at least branch information;
creating a track table containing a plurality of track table rows corresponding to a plurality of tracks based on the extracted instruction information, each table row corresponding to a track representing an instruction block in the program sequence loaded into the cache and including a plurality of entries, each entry corresponding to a track point, which corresponds to at least one instruction in the cache; and
determining the cache address of the branch target instruction based on the plurality of tracks before the branch instruction is executed.

26. A pipeline control system for controlling a pipeline operation of a processor coupled to a memory containing executable computer instructions, the pipeline control system including:
an examining circuit configured to store a branch target instruction of a branch instruction, the branch instruction having a branch condition, and a next instruction following the branch instruction in a program sequence into a cache;
an addressing circuit coupled to the processor to, without predicting whether the branch condition is satisfied or not, provide the processor with both a cache address of the branch target instruction of the branch instruction and a cache address of said next instruction following the branch instruction, wherein a cache address is different from a memory address for addressing the memory; and
a read buffer coupled between the cache and the processor and configured to store at least one of the branch target instruction of the branch instruction and said next instruction using a corresponding cache address,
wherein the read buffer further includes a selector coupled to the processor to provide the processor with either the branch target instruction or said next instruction when the branch instruction is executed such that the pipeline operation is not stalled whether or not a branch is taken with respect to the branch instruction, and
wherein the addressing circuit is configured to create a track table containing a plurality of track table rows corresponding to a plurality of tracks, each table row corresponding to a track representing an instruction block in the program sequence loaded into the cache and including a plurality of entries, each entry corresponding to a track point, which corresponds to at least one instruction.

27. The pipeline control system according to claim 26, wherein:
the cache is configured to output at least two instructions in one cycle; and
the read buffer is configured to store at least two instructions in one cycle.

28. The pipeline control system according to claim 27, wherein:
the cache includes a single port memory module with a bandwidth larger than an instruction issue rate of the processor.

29. The pipeline control system according to claim 27, wherein:
one portion of an address for the read buffer is used to read out the at least two stored instructions from a cache block in the cache; and
another portion of the address for the read buffer is used to select an instruction from the at least two read-out instructions.

30. The pipeline control system according to claim 27, wherein:
during a first cycle, the cache address of the branch target instruction is obtained to be provided to the cache for reading at least two instructions including the branch target instruction.

31. The pipeline control system according to claim 30, wherein:
during a second cycle, the at least two instructions including the branch target instruction are outputted from the cache, and the cache address of the branch instruction is obtained to be provided to the cache for reading at least two instructions including the branch instruction.

32. The pipeline control system according to claim 31, wherein:
during a third cycle, the at least two instructions including the branch target instruction are stored in the read buffer, the at least two instructions including the branch instruction are outputted from the cache, and the cache address of said next instruction is obtained to be provided to the cache for reading at least two instructions including said next instruction.

33. The pipeline control system according to claim 32, wherein:
during a fourth cycle, the at least two instructions including the branch target instruction are outputted from the read buffer, and the at least two instructions including said next instruction are outputted from the cache.

34. The pipeline control system according to claim 32, wherein:
a control signal from the processor indicating whether or not the branch is taken determines whether to choose the at least two instructions including the branch target instruction, or the at least two instructions including said next instruction for the processor.

35. The pipeline control system according to claim 34, wherein:
a portion of a program counter (PC) offset is used to select the branch target instruction from the at least two instructions including the branch target instruction or said next instruction from the at least two instructions including said next instruction.

36. The pipeline control system according to claim 26, wherein:
the track table stores the cache address of the branch target instruction as a content of an entry corresponding to the branch instruction in the track table.

37. The pipeline control system according to claim 26, further including:
a second selector coupled to the cache to provide the cache with either the cache address of the branch target instruction or the cache address of said next instruction to read out the branch target instruction or said next instruction to store in the read buffer, based on instruction type information provided by the addressing circuit.

* * * * *